Oct. 15, 1974   A. RUBINICH   3,841,940
APPARATUS FOR APPLYING ADVERTISING BANDS ON
CYLINDRICAL CONTAINERS
Filed Nov. 29, 1972   2 Sheets-Sheet 1

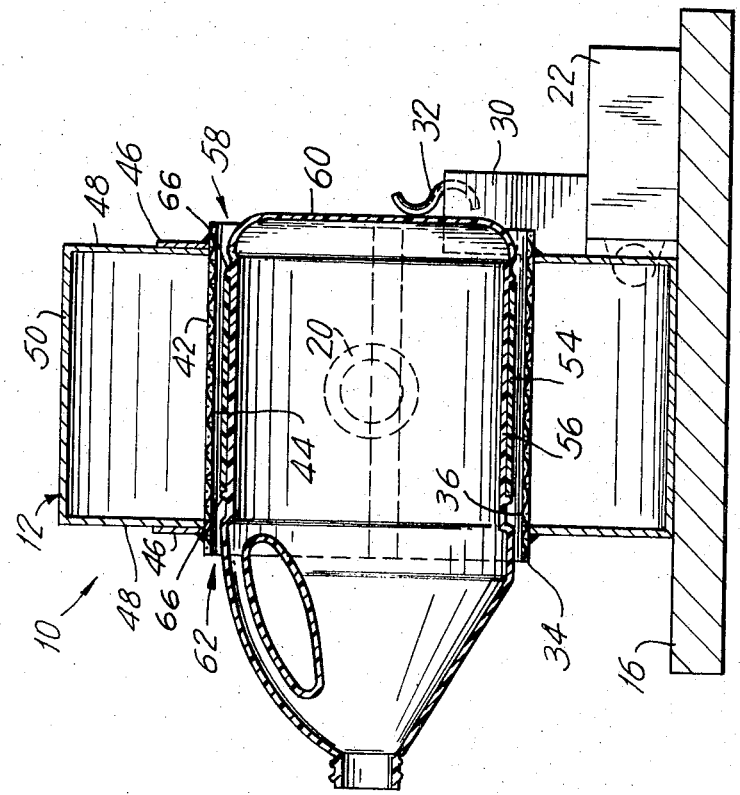
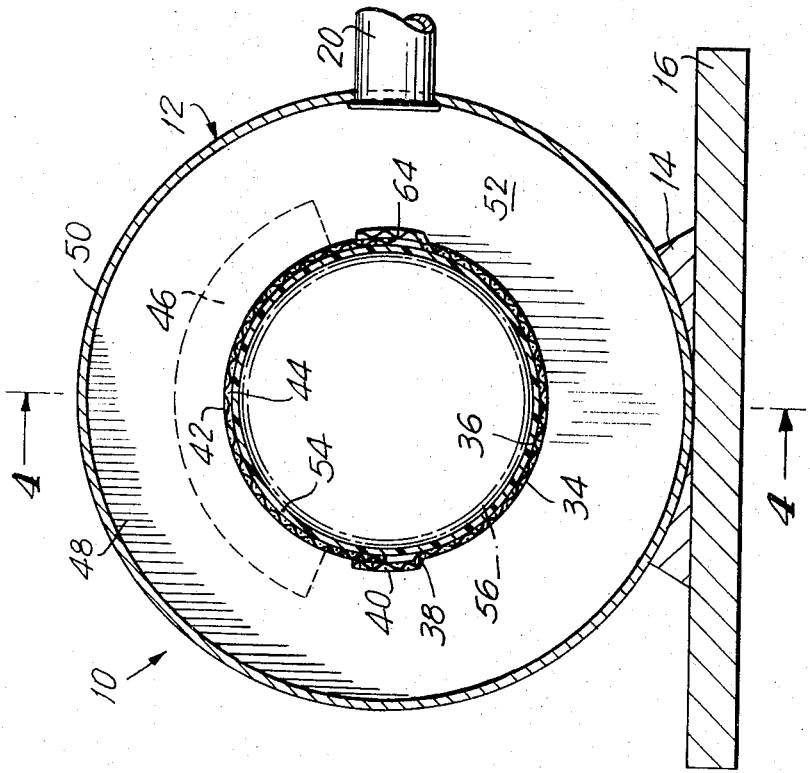

United States Patent Office
3,841,940
Patented Oct. 15, 1974

3,841,940
APPARATUS FOR APPLYING ADVERTISING BANDS ON CYLINDRICAL CONTAINERS
Anthony Rubinichi, 103—33 102nd St.,
Ozone Park, N.Y. 11417
Filed Nov. 29, 1972, Ser. No. 310,370
Int. Cl. B32b *31/00*
U.S. Cl. 156—367                14 Claims

ABSTRACT OF THE DISCLOSURE

An apparatus for applying advertising or other type plastic bands on the peripheral surface of cylindrical and other configuration containers comprising a housing including a fixed lower portion and a movable upper portion, both upper and lower housing portions being of substantially semicircular configuration and having a mesh or screen inner peripheral surface. A vacuum source is connected to said housing and is activated by a microswitch controlled relay with the microswitch being disposed at the outlet end of said housing. With the vacuum source in a normally operated condition, a plastic band is inserted into the outlet end of the housing and the vacuum causes the band to open to the internal configuration of said housing (circular), thereafter the vacuum acting on said band causes the upper portion of the housing to move upwardly to distend said plastic band slightly, enlarging the diameter thereof. Thereafter, a cylindrical container is inserted into the inlet end of the housing within the plastic band. Removal of the container from the housing causes activation of the microswitch to thereby cause the relay to deactivate said vacuum source, thereby permitting said distended plastic band to tend to return to its normal diameter which is slightly less than or equal to that of said container. The band is then snugly fitted upon said container and the combination is then entirely removed from said housing, releasing said microswitch, and reactivating said vacuum source.

BACKGROUND OF THE INVENTION

It has now become commonplace in the art of packing to employ translucent semi-rigid plastic containers for bottling of liquid products and to identify the products by the application of a separable clear plastic band of substantially circular configuration upon the central portion of the container. Thus, the containers may be manufactured in large quantities for a large variety of products and the plastic bands may be fabricated separate and apart therefrom with the desired advertising and descriptive literature in predetermined color layout. At present the plastic bands or sleeves are slid over the tops of the containers and applied upon the central portion of the containers manually. This manual operation is expensive, time consuming and difficult since, in most instances, the diameter of the bands is substantially the same as that of the peripheral of the container. Accordingly, most times the bands must be preheated to cause some distention thereof and thereafter, the bands which are usually folded upon themselves, must be opened or spread apart and applied upon the containers.

SUMMARY OF THE INVENTION

Accordingly, it is the primary object of the present invention to provide a new and novel apparatus and method for automating the application of advertising bands upon the outer peripheral surface of product containers.

It is another object of the present invention to provide an automatic band applying apparatus of the foregoing type which is capable of relatively simple manufacture, installation and use.

It is a further object of the present invention to provide an apparatus of the foregoing type which is capable of use by unskilled personnel and which will enable them to speedily accomplish the purposes intended.

It is yet another object of the present invention to provide an automatic band applying apparatus which deletes the necessity for manually opening the band prior to the application thereof upon a container.

It is still a further object of the present invention to provide an apparatus of the foregoing type which may be fabricated relatively inexpensively.

BRIEF DESCRIPTION OF THE DRAWINGS

The foregoing other objects, features and advantages of the present invention will become more apparent from the detailed description hereinafter considered in conjunction with the accompanying drawings wherein:

FIG. 3 is a sectional view similar to FIG. 1, wherein the plastic band is in its distended position and the container is inserted into the apparatus housing; and FIG. 4 is a sectional view taken on the line 4—4 of FIG. 3.

DESCRIPTION OF THE PREFERRED EMBODIMENT

Figure 1:
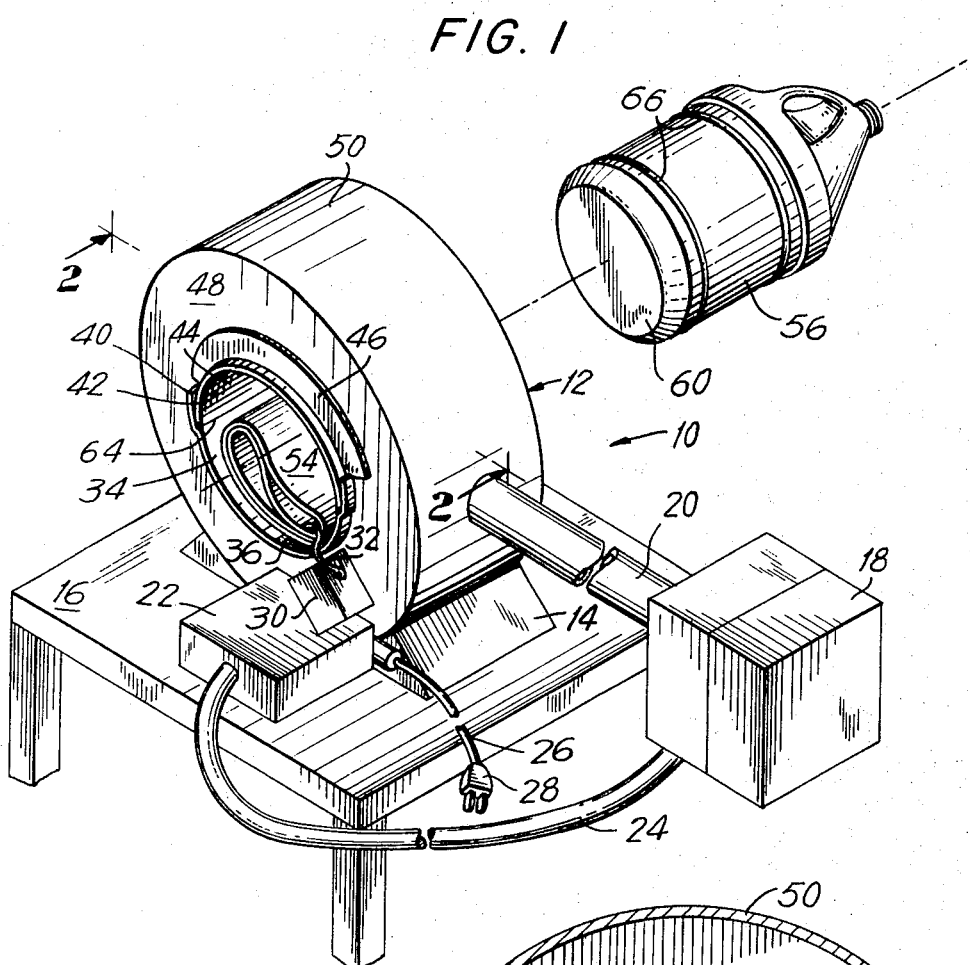
FIG. 1 is a perspective view of the apparatus for automatically applying advertising bands on cylindrical containers, constructed pursuant to the principles of the present invention and in accordance with the preferred embodiment thereof.

Referring now to the drawings, and more particularly to FIG. 1 thereof, there is shown the automatic apparatus for applying plastic advertising bands upon containers which apparatus is constructed pursuant to the principles of the present invention in accordance with the preferred embodiment thereof. The apparatus is generally designated by the reference numeral 10 and includes a housing 12 mounted on a housing base 14. The housing rests upon a platform or desk 60. The vacuum source 18 which may be any suitable source of vacuum; e.g., a commercially available vacuum cleaner, is connected to the housing 12 via a conduit or pipe 20. It is herein to be noted that although the pipe 20 herein illustrated and described as being of rigid construction, the same may also be fabricated of flexible material and a support provided for the vacuum source 18.

The relay switch 22, preferably of the DPDT type, is connected to the vacuum source 18 by an electrical lead 24, while the relay switch 22 is itself connected to an A.C. power source (not shown) via the electrical lead line 26 and a plug 28. The relay switch 22 is activated by means of a microswitch 30 connected thereto, when the finger 32 of the microswitch is activated, to thereby control the power supplied to the vacuum source 18, as will be discussed in detail hereinafter.

The housing 12 includes a fixedly positioned lower portion 34 having an inner mesh surface 36. The fixed portion 34 is of substantially semicircular configuration having longitudinally extending shoulders 38 at the upper end thereof which are formed integrally with upwardly extending longitudinal flanges 40 at the upper ends of said fixed portion. The housing 12 also includes a laterally or vertically movable upper portion 42 which is also provided with a mesh or screen inner surface 44. The upper portion 42 is also of substantially semicircular configuration and is mounted against longitudinal movement by means of integrally formed flanges or ears 46 disposed in adjacent proximate relationship with the sides 48 of the housing 12. It is to be noted that although the integrally formed flanges 46 are disposed in adjacent proximate relationship with the sides 48 of the housing, the upper portion 42 is still capable of lateral or upward movement as viewed in FIG. 1, as will be discussed further hereinafter.

Figure 2:
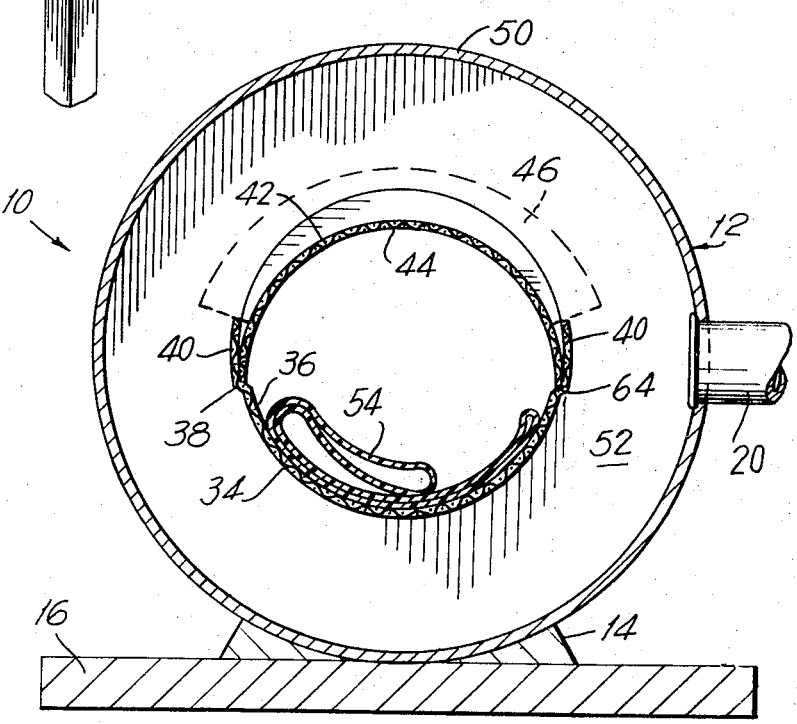
FIG. 2 is a sectional view of the apparatus taken on the line 2—2 of FIG. 1.

In the operation of the apparatus 10, the plug 28 is connected to the A.C. power source (not shown) and power is supplied lead line 26, relay switch 22 and lead line 24 to the vacuum source 18. With the microswitch 30, and the finger 32 thereof, in the position illustrated in FIG. 1, power is continuously supplied to the vacuum source 18 to cause a vacuum to be applied within the housing 12 via conduit 20. In this regard, it is to be noted that the vacuum is applied between the outer casing 50 of the housing 12 and the inner mesh surfaces 36 and 44 of the fixed lower portion 34 and the movable upper portion 42, respectively. Thus, the vacuum is applied within the annular space designated 52 in FIG. 2.

When it is desired to apply a plastic band 54 upon a plastic container 56, the plastic sleeve or band 54 is merely inserted into the outlet end 58 of the housing and initially rests upon the mesh surface 36 of the fixed lower housing portion 34. Since as discussed previously hereinabove, the vacuum source 18 is operative to cause a vacuum in the annular space 52, the sleeve 54 will almost instantaneously open or be spread apart to conform to the inner peripheral configuration of the housing 12. More particularly, the sleeve 54 will open into a substantially circular configuration to conform with the geometrical configuration formed by the combination of the upper and lower housing portions 42 and 34, respectively. Thereafter the vacuum will act through the mesh screens 36 and 44 upon said opened sleeve to cause outside air pressure to exert an inward force on said open sleeve and to distend the same a distance equal to the increase in diameter of the circle formed by the upper and lower housing portions 42 and 34. This increase in diameter is occasioned and defined by the lateral upward movement of the upper housing portion 42. It is herein to be noted that once the sleeve or band 54 has been opened and distended, as aforedescribed, it will remain in that position until the source of vacuum to the annular space 52 is removed. Thus, after the sleeve has been opened and distended, the operator merely need take the container 56 and insert the lower end 60 thereof into the inlet end 62 of the housing 12. Since the diameter of the container 56 is less than the normal and extended diameters of the circles formed by the housing portions 34 and 42, the container 56 is easily movable through the housing from the inlet end 62 to the outlet end 58.

It is herein to be noted that the plastic band 54 has herein been described as being fabricated of a plastic material, the same may be fabricated of any other suitable material which is capable of being distended, such as paper. Moreover, it is also possible to modify the housing 12 to accommodate paper and other type bands having minimal distention characteristics.

Reference is now made to FIGS. 3 and 4 wherein it will be seen that the container in passing through the housing 12 has the central portion thereof disposed within the open band 54 prior to emerging from the housing. As the container commences its egress from the housing 12 the bottom portion 60 thereof engages the finger 32 of the microswitch 30, thereby activating the relay switch 22 and causing the A.C. power to the vacuum source 18 to be shut off. When this occurs, the plastic band due to its memory or retentivity returns or snaps back to its normal state since the distending force is no longer present. Concomitantly therewith, the upper housing portion 42 returns to its normal position. This causes the plastic band to fit snugly and to conform to the outer peripheral configuration of the container 56. The vacuum source 18 remains inactivated during the emergency of the container 56 outwardly of the housing 12 via end 58 until such time as the finger 32 of microswitch 30 is permitted to return to its normal deactivated condition at which time that portion of the container 56 having the band 54 therearound is removed from contact with the vacuum. Thereafter the vacuum source 18 is again activated and the process is repeated.

Attention is directed to the fact that during the lateral or upward and outward movement of the upper housing portion 42 the lower edges 64 of the upper housing portion 42 ride upon the inner surface of the flanges 40 of the fixed lower housing portion 34 to thereby ensure that the effective geometrical configuration formed by the combination of the upper and lower housing portions 34 and 42, is circular. When the vacuum source 18 is deactivated, as discussed hereinabove, the upper housing portion 42 moves laterally downward upon the inner surfaces of the flanges 40 and again returns to its lower resting position with the edges 64 disposed in abutting engagement upon the shoulders 38 of the lower fixed housing portion 34.

It will be apparent to those skilled in the art that the speed and ease of applying the plastic advertising sleeves 54 upon the container 56 in the manner hereinabove described by use of the automatic apparatus of the present invention, results in very substantial production by the operator of the apparatus without requiring any effort on the part of the operator to ensure the prior placement of the band on the container.

With reference to FIG. 1, it is to be noted that the container 56 may be provided with a pair of peripheral beads or flanges 66 whose distance therebetween may be substantially equal to the height of the plastic band 54. Thus, by properly positioning the finger 32 of the microswitch 30 with respect to the outlet end 58 of the housing 12, the apparatus can be made to apply the distended plastic sleeve 54 precisely within the space defined by the two parallel extending peripheral beads 66.

It is herein to be noted that although the operation of the present apparatus has been described as one wherein the container 56 is passed entirely through the housing 12 via outlet end 58, in some applications the finger 32 of microswitch 30 may be adjusted to accomplish the following operation. The container 56 may be inserted into the inlet end 62 until the lower end 60 of container 56 engages finger 32 to deactivate the vacuum source. Thereafter, the container 56 having the band 54 thereon may be removed via the inlet end 62.

It is thus seen that the present apparatus provides an effective system and method for quickly, easily and dependably applying plastic advertising bands upon the outer peripheral surfaces of plasticized product containers. Of course, the product containers may also be fabricated of glass, metal or the like. Moreover, it is to be noted that the internal geometrical configuration of the housing and the outer peripheral configuration of the product containers need not be circular. In this regard, it is possible to employ elliptical or rectangular configured housings or containers and the configurations need not be the same for the apparatus and system of the invention to operate in the manner described.

Althiugh I have shown and described a preferred embodiment of my invention, it will be apparent to those versed and skilled in the art that there are many changes, modifications and improvements which may be made therein without departing from the spirit and scope of the invention.

What is claimed is:

1. Apparatus for automatically applying identification bands upon the external peripheral surface of product containers comprising
   means for fixedly positioning said bands,
   said bands being of the distendable type,
   said positioning means being capable of receiving said product containers in predetermined relationship with respect to said bands, and comprising a housing including
      a fixed lower portion, and a movable upper portion,
said upper portion being movable in predetermined relationship with respect to said lower portion,
said positioning means also including a source of vacuum,
means for connecting said vacuum source to said housing,
said vacuum source being operable upon the application of a band to the lower housing portion to open said distendable band to a predetermined geometrical configuration,
said upper housing portion being operable after the initial opening of said band to move upwardly to cause distention of said band, and
releasing means operable to deactivate said vacuum source to cause said band to return to its undistended state and in conformal engagement with said product container outer peripheral surface.

2. Apparatus for automatically applying identification bands upon product containers in accordance with Claim 1, wherein
said releasing means comprises switch means for controlling said vacuum source,
said switch means including deactivating means responsive to the engagement therewith of the bottom portion of said product container to deactivate said vacuum source.

3. Apparatus for automatically applying identification bands upon product containers in accordance with Claim 2, wherein
said deactivating means is operable to maintain said vacuum source in a deactivated condition until after that portion of said product container having said band thereon emerges from said housing.

4. Apparatus for automatically applying identification bands upon product containers in accordance with Claim 2, wherein
said upper and lower housing portions have a substantially semicircular cross-sectional configuration.

5. Apparatus for automatically applying identification bands upon product containers in accordance with Claim 2, wherein
said upper and lower housing portions have mesh inner peripheral surfaces, and
said mesh inner surfaces being in fluid flow communication with said vacuum source.

6. Apparatus for automatically applying identification bands upon product containers in accordance with Claim 4, wherein
said lower housing portion includes a pair of longitudinally extending flanges, and
said upper housing portion is laterally movable within the confines defined by said flanges.

7. Apparatus for automatically applying identification bands upon product containers in accordance with Claim 6, wherein
said housing includes an external shell,
said upper housing portion being provided with a pair of ears disposed in abutting engagement with said shell to prevent longitudinal movement of said upper housing portion.

8. Apparatus for automatically applying identification bands upon the external peripheral surface of product containers comprising
a housing including
an outer casing,
a fixed lower portion, and
a movable upper portion,
said upper and lower portions being disposed within said casing and said casing having an inlet end and an outlet end,
a source of vacuum,
switch means disposed in proximate relationship to said outlet end for controlling said vacuum source,
means connecting said vacuum source to said housing casing,
said fixed lower portion being adapted to receive a flat folded band thereon,
said vacuum source being normally operative to cause said folded band to open,
said upper housing portion being movable upon the opening of said band to permit of distention thereof, and
said switch means being operative upon engagement with an end of said product container to deactivate said vacuum source and cause said distended band to return to an undistended condition disposed in conformal engagement with the outer peripheral portion of said product container.

9. Apparatus for automatically applying identification bands upon the external peripheral surface of product containers in accordance with Claim 8, wherein
said upper and lower housing portions have mesh inner peripheral surfaces, and
said mesh inner surfaces being in fluid flow communication with said vacuum source.

10. Apparatus for automatically applying identification bands upon the external peripheral surface of product containers in accordance with Claim 8, wherein
the inner peripheral surfaces of said upper and lower housing portions define a predetermined geometrical configuration similar to the geometrical configuration of said product container.

11. Apparatus for automatically applying identification bands upon the external peripheral surface of product containers in accordance with Claim 8, wherein
said switch means includes a microswitch,
said microswitch including a finger disposed adjacent said outlet end, whereby engagement of said finger by said end of said product container deactivates said vacuum source.

12. Apparatus for automatically applying identification bands upon the external peripheral surface of product containers in accordance with Claim 11, wherein
said microswitch finger is operable to maintain said vacuum source in a deactivated condition until after that portion of said product container having said band thereon emerges from said housing, whereafter said finger is released to reactivate said vacuum source.

13. Apparatus for automatically applying identification bands upon the external peripheral surface of product containers in accordance with Claim 8, wherein
said lower housing portion includes a pair of longitudinally extending flanges, and
said upper housing portion is laterally movable within the confines defined by said flanges.

14. Apparatus for automatically applying identification bands upon the external peripheral surface of product containers in accordance with Claim 8, wherein
said product container includes a pair of parallel spaced apart beads, and
said band is undistended upon said product container outer peripheral surface in the space defined by said spaced apart beads.

References Cited
UNITED STATES PATENTS

| 3,367,822 | 2/1968 | Hoffler | 156—285 X |
| 3,404,505 | 10/1968 | Hohl et al. | 53—198 X |
| 3,509,684 | 5/1970 | Hohl et al. | 53—198 R X |

EDWARD G. WHITBY, Primary Examiner

U.S. Cl. X.R.

53—198; 100—9; 156—86, 229, 285, 475, Dig. 9